United States Patent
Chou et al.

(10) Patent No.: US 10,205,371 B2
(45) Date of Patent: Feb. 12, 2019

(54) VOICE COIL MOTOR

(71) Applicant: SAE Magnetics (H.K.) Ltd., Hong Kong (CN)

(72) Inventors: Sidney Chou, Hong Kong (CN); Yiu Sing Ho, Hong Kong (CN); Kam Fung Yip, Hong Kong (CN); Wen Ju Yang, Hong Kong (CN); Hai Yang Wu, Hong Kong (CN); Shou Sheng Gao, Hong Kong (CN); Yong Bing Hu, Hong Kong (CN); Guo Hong Lu, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 317 days.

(21) Appl. No.: 15/082,228

(22) Filed: Mar. 28, 2016

(65) Prior Publication Data

US 2016/0308430 A1  Oct. 20, 2016

(30) Foreign Application Priority Data

Apr. 20, 2015  (CN) ..................... 2015 2 0239977 U

(51) Int. Cl.
H02K 41/035 (2006.01)
G02B 7/08 (2006.01)

(52) U.S. Cl.
CPC ........... *H02K 41/0356* (2013.01); *G02B 7/08* (2013.01)

(58) Field of Classification Search
CPC ................................. H02K 41/0356
USPC ....................................... 310/12.16
See application file for complete search history.

(56) References Cited

U.S. PATENT DOCUMENTS

| | | | | |
|---|---|---|---|---|
| 8,368,255 B2* | 2/2013 | Park | ............ | H02K 41/0356 310/12.16 |
| 8,912,690 B2* | 12/2014 | Kim | ............ | G02B 7/08 310/12.16 |
| 9,250,415 B2* | 2/2016 | Min | ............ | H02K 41/0356 |
| 9,515,542 B2* | 12/2016 | Kim | ............ | G02B 7/08 |
| 9,575,283 B2* | 2/2017 | Lee | ............ | H02K 41/0356 |
| 9,575,329 B2* | 2/2017 | Kim | ............ | G02B 27/646 |
| 9,658,425 B2* | 5/2017 | Min | ............ | H02K 41/0356 |
| 9,722,481 B2* | 8/2017 | Lee | ............ | H02K 41/0356 |
| 9,804,354 B2* | 10/2017 | Kasuga | ............ | H02K 41/0356 |
| 9,819,254 B2* | 11/2017 | Jung | ............ | H02K 41/0356 |
| 9,939,606 B2* | 4/2018 | Kim | ............ | G02B 7/023 |
| 10,007,082 B2* | 6/2018 | Park | ............ | G02B 7/023 |
| 2012/0008221 A1* | 1/2012 | Min | ............ | H02K 41/0356 359/824 |

(Continued)

*Primary Examiner* — Jeremy A Luks
(74) *Attorney, Agent, or Firm* — Nixon & Vanderhye PC

(57) ABSTRACT

A voice coil motor includes a housing having a cavity; a movable assembly received in the cavity; a fixing assembly configured outside of the movable assembly; and a first spring plate and a second spring plate configured at an upper surface and a lower surface of the movable assembly respectively. The fixing assembly comprises at least two magnetic elements connected with the first spring plate and a spacer member configured on the second spring plate to connect the second spring plate to the magnetic elements or the housing. The voice coil motor is served as an actuator of electronic products such as digital cameras, mobile phones, and digital cameras, which has thin thickness, good performance and strong applicability.

12 Claims, 10 Drawing Sheets

(56) References Cited

U.S. PATENT DOCUMENTS

| | | | |
|---|---|---|---|
| 2016/0116703 A1* | 4/2016 | Cheng | H02K 41/0356 |
| | | | 359/557 |
| 2016/0190905 A1* | 6/2016 | Han | H02K 41/035 |
| | | | 359/557 |
| 2016/0308430 A1* | 10/2016 | Chou | G02B 7/08 |
| 2016/0377881 A1* | 12/2016 | Jung | G02B 7/08 |
| | | | 359/824 |
| 2017/0038600 A1* | 2/2017 | Hee | G02B 27/646 |
| 2017/0115464 A1* | 4/2017 | Lee | H02K 41/0356 |
| 2017/0123180 A1* | 5/2017 | Osaka | G02B 7/09 |
| 2017/0248767 A1* | 8/2017 | Min | H02K 41/0356 |
| 2017/0288525 A1* | 10/2017 | Lee | H02K 41/0356 |
| 2018/0175714 A1* | 6/2018 | Hsu | H02K 35/02 |

\* cited by examiner

VOICE COIL MOTOR

RELATED APPLICATIONS

This application claims the benefit of priority to Chinese Application No. 201520239977.9, filed Apr. 20, 2015, which is hereby incorporated by reference in its entirety.

FIELD OF THE INVENTION

The present invention relates to technical field of voice coil motors and, more particularly to voice coil motor having thin and compact structure.

BACKGROUND OF THE INVENTION

Voice coil motors are used as actuators of electronic products (such as digital cameras, mobile phones, and digital cameras etc.) as they have small size, low price and save power.

As shown in FIG. 1, a conventional voice coil motor 1' includes a housing 10', a base 20', a movable assembly 30', four magnets 40' around the movable assembly 30', a top spring plate 50' and a bottom spring plate 60' located at the upper and lower surfaces of the movable assembly 30' respectively. A cavity 12' is defined by the housing 10' and the base 20', in which the movable assembly 30' is installed. During the assembly of the voice coil motor 1', upper and lower surfaces of the top spring plate 50' are firmly connected with the housing 10' and the magnets 40' respectively, the movable assembly 30' is configured between the top and bottom spring plates 50', 60', the bottom spring plate 60' is fixed to the base 20' which is firmly connected with the housing 10'. The movable assembly 30' includes a lens holder 32' and a coil 34' winding on the lens holder 32', and the lens holder 32' is used for holding components such as lens barrel, focus lens or zoom lens, etc., and the top and bottom spring plates 50', 60' are used for protecting the lens barrel, focus lens or zoom lens. After the coils 34' on the movable assembly 30' is energized, magnetic force is generated between the coil 34' and the magnets 40', so that the movable assembly 30' is moved in the cavity 12' to change the distance between the components, such as lens barrel, focus lens or zoom lens, and a camera sensor, thereby focusing or zooming.

The base 20' in FIG. 1 like a cover includes a cover edge 22' connected with the housing 10' and a connecting portion 24' inserted into the cavity 12' to connect with the second spring plate 60'. Thus the cover edge 22' is protruded out of the housing 10', which increases the total height and size of the voice coil motor. Furthermore, when the voice coil motor is applicable to cameras, the pixels will be restricted. By this token, the conventional thick voice coil motor can not meet the demand of thin and compact electronic products such as cameras, mobile phones, etc.

Thus there is a need to provide a thinner voice coil motor to overcome the drawbacks mentioned above.

SUMMARY OF THE INVENTION

One Objective of the present invention is to provide a thinner voice coil motor.

To achieve the above-mentioned objective, a voice coil motor includes a housing having a cavity; a movable assembly received in the cavity; a fixing assembly configured outside of the movable assembly; and a first spring plate and a second spring plate configured at an upper surface and a lower surface of the movable assembly respectively. The fixing assembly comprises at least two magnetic elements connected with the first spring plate and a spacer member configured on the second spring plate to connect the second spring plate to the magnetic elements or the housing.

In comparison with the prior art, the voice coil motor of the present invention has the spacer assembly, whereby the second spring plate is fixed to the magnetic element, and the magnetic element is connected to the first spring plate and fixed to the housing; or the second spring plate is directly fixed to the housing by means of the spacer assembly, and the magnetic element connected with the first spring plate is fixed to the spacer assembly. Thus no base with cover edge is used, therefore the thickness of the voice coil motor is reduced to improve the performance and the practicability of the voice coil motor.

Preferably, the movable assembly comprises a lens holder and a coil winding on the lens holder.

Preferably, the first spring plate comprises a first outer frame, a first inner frame, and a first spring portion connected with the first outer frame and the second inner frame, the second spring plate comprises a second outer frame, a second inner frame and a second spring portion connected with the second outer frame and the second inner frame, the first inner frame is connected with an upper surface of the lens holder, and the second inner frame is connected with a lower surface of the lens holder.

As a preferred embodiment, the housing has a top plate, the first outer frame has an upper surface connected with the top plate and a lower surface connected with the magnetic elements, and the spacer member is connected the second outer frame to the magnetic elements.

Optionally, the spacer member comprises at least two spacers.

Optionally, the spacer member is in a frame structure.

As another preferred embodiment, the housing has a top plate, the spacer member comprises a frame and at least two connecting arms extended downwards from the frame and connected with the second outer frame, and the frame has an upper surface connected to the top plate and a lower surface connected to the first outer frame.

Preferably, the housing has a top plate which has a slot to expose the first spring portion and adapt to receive the first spring portion that is protruded toward the top plate.

Preferably, the housing has a top plate with a through hole formed on a center thereof, two stoppers are formed around the through hole and vertically extended downwards, and the stoppers are inserted between the lens holder and the coil to retain the movable assembly within the cavity.

Preferably, the spacer member is made of nonconductive material.

Optionally, the voice coil motor further includes a base configured below the second spring plate and connected with the second outer frame.

Preferably, the base is made of nonconductive material.

Optionally, the voice coil motor further includes an optical image stabilizer configured below the second spring plate and connected with the second outer frame.

Preferably, the second inner frame is provided with a hole, the lens hole is provided with a first recess at a lower surface thereof to align with the through hole, a coil end of the coil passes through the first recess and is connected with the second inner frame via solder, thereby connecting the second inner frame with the lens holder.

Preferably, the lens holder is provided with a second recess that is communicated with the first recess and configured to guide the coil end of the coil to the first recess.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
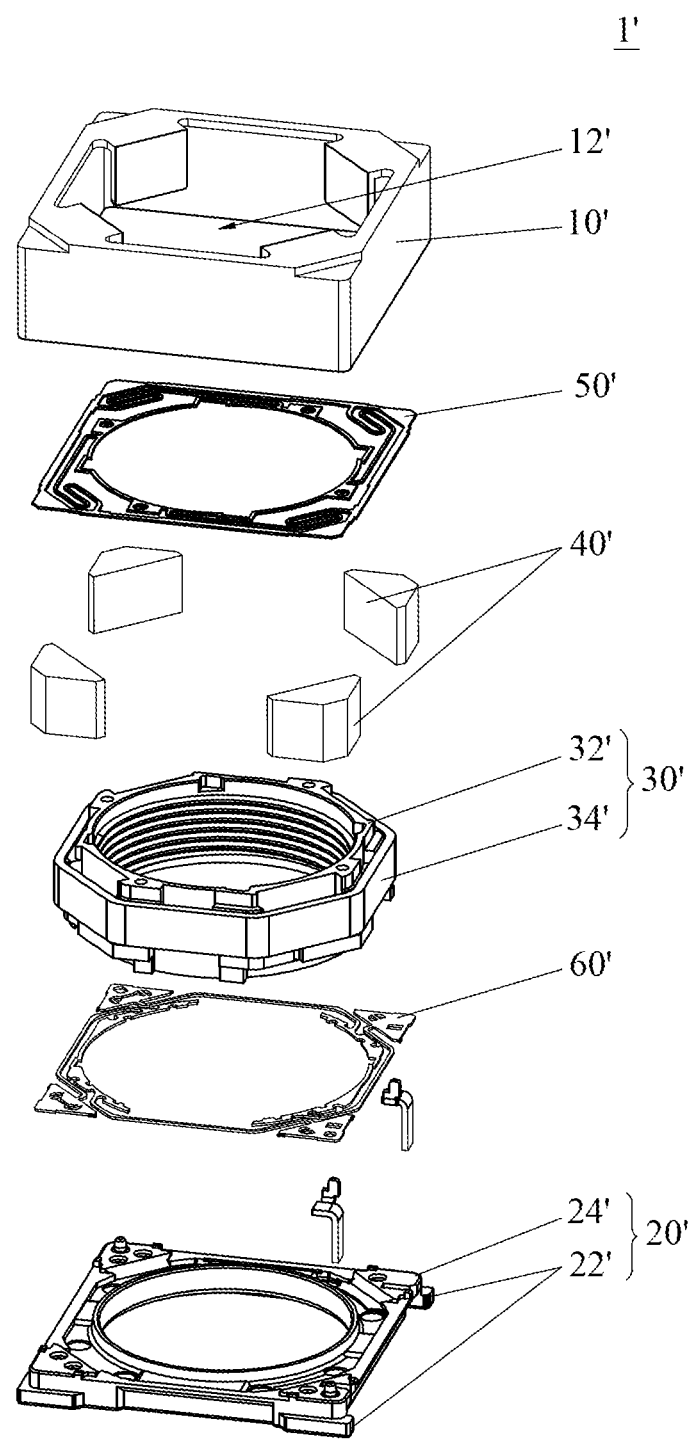
FIG. 1 is an exploded view of a conventional voice coil motor.

Various preferred embodiments of the invention will now be described with reference to the figures, wherein like reference numerals designate similar parts throughout the various views. The present invention is directed to a thin and compact voice coil motor.

Figure 2:
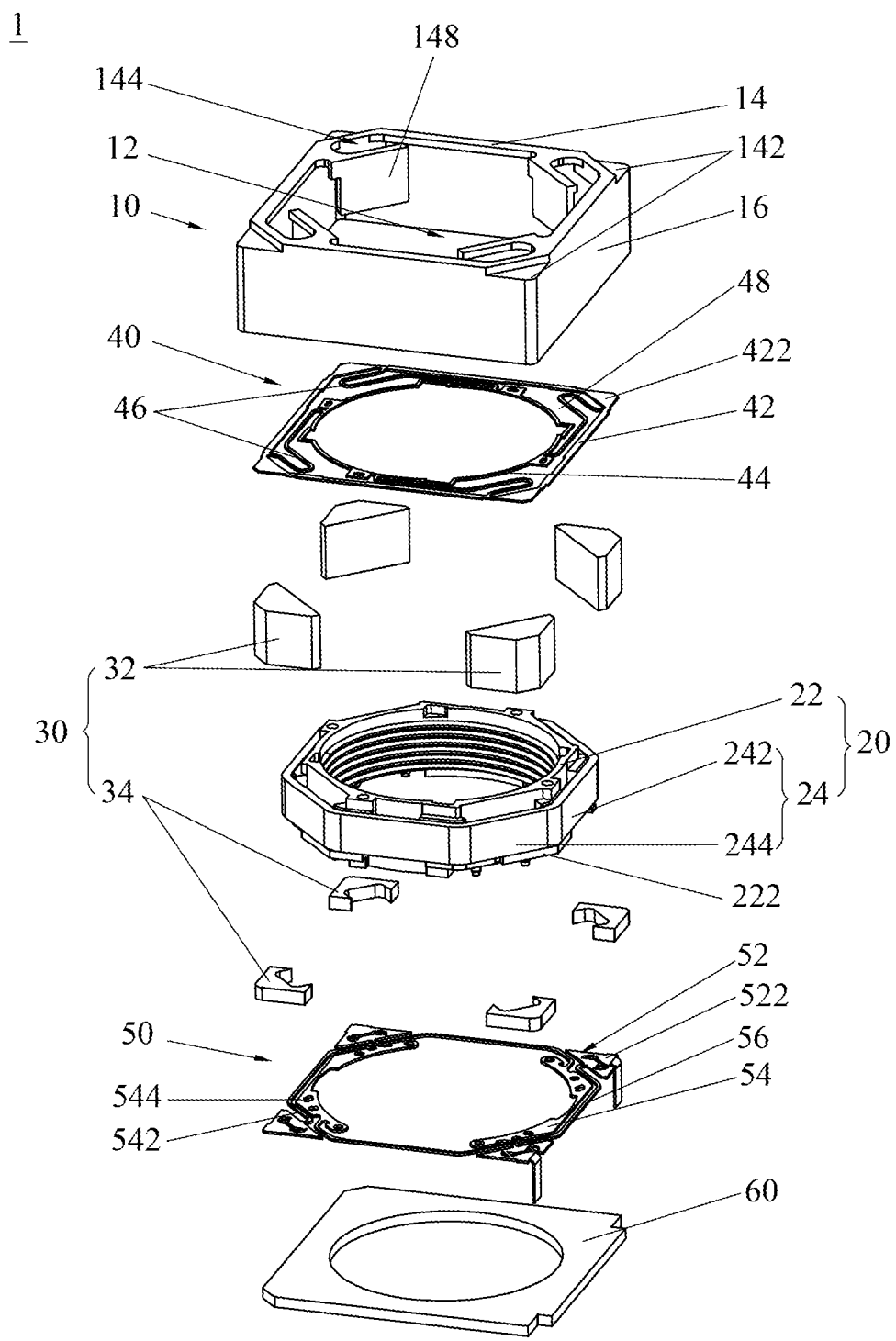
FIG. 2 is an exploded view of a voice coil motor according to a first embodiment of the present invention.
Figure 3:
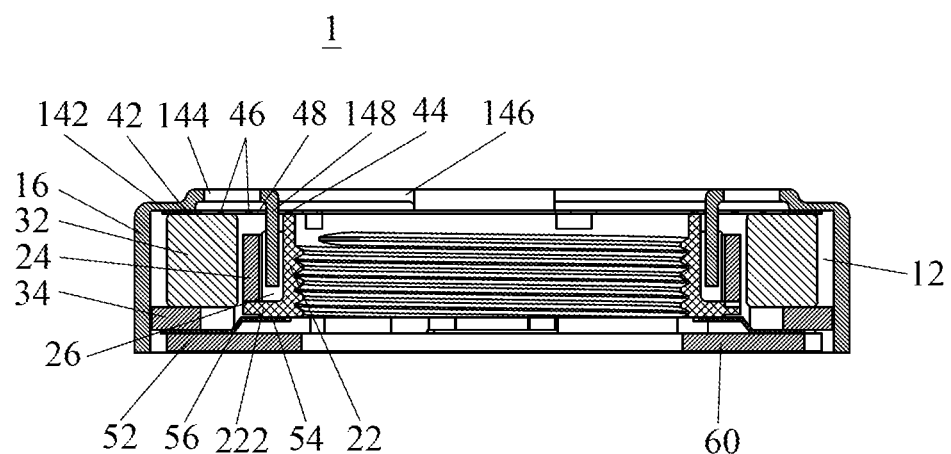
FIG. 3 is a sectional view of a voice coil motor according to the present invention.
Figure 4:
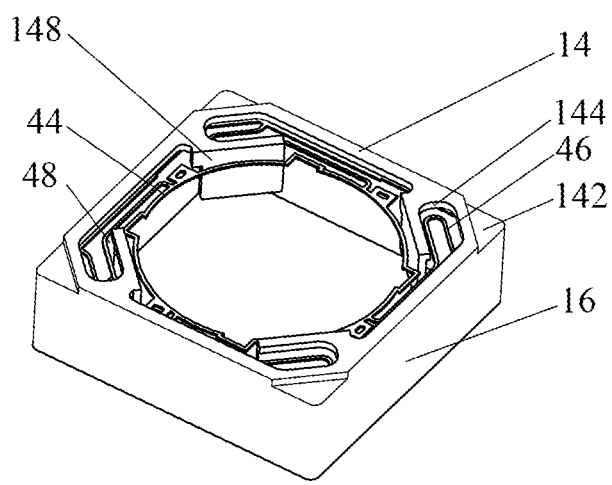
FIG. 4 is a perspective view of a housing and a first spring plate of the voice coil motor of FIG. 2.
Figure 5:
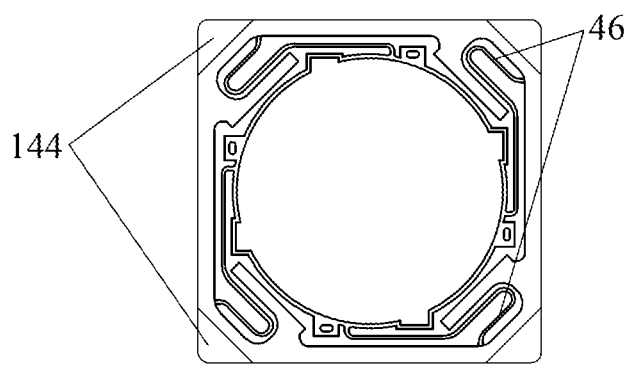
FIG. 5 is a top view of FIG. 4.
Figure 6:
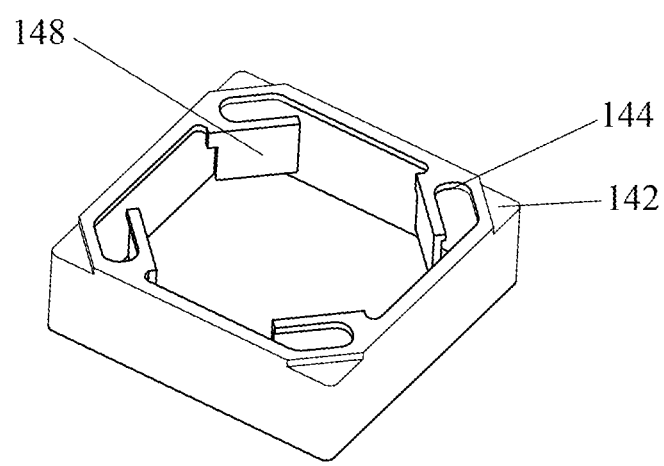
FIG. 6 is a perspective view of the housing of the voice coil motor of FIG. 2.
Figure 7:
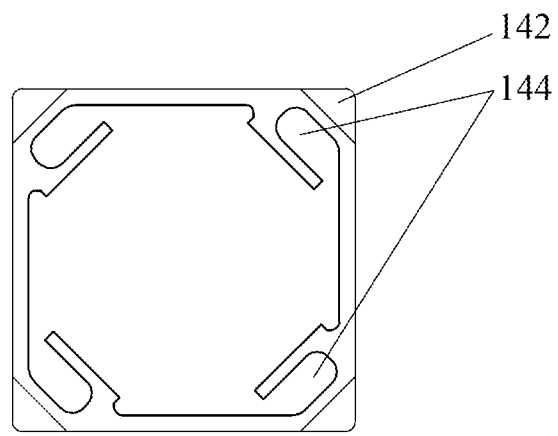
FIG. 7 is a top view of FIG. 6.

FIGS. 2 to 3 show a voice coil motor 1 according to a first embodiment. As illustrated, the voice coil motor 1 include a housing 10 having a cavity 12, a movable assembly 20 received in the cavity 12, a fixing assembly 30 configured outside of the movable assembly 20, and a first spring plate 40 and a second spring plate 50 configured at an upper surface and a lower surface of the movable assembly 20 respectively. Specifically, the fixing assembly 30 includes at least two magnetic elements and a spacer member 34. In the embodiment, the magnetic elements include four magnets 32 which are shaped in triangular prism substantially, and the spacer member 34 includes at least two spacers, e.g. four spacers preferably.

More specifically, the housing has a foursquare top plate 14 and four side plates 16 vertically to the top plate to define the cavity 12, and four first fixing portions 142 are provided at four corners of the top plate 14 respectively.

As shown in FIG. 2, the movable assembly 20 includes a lens holder 22 and a coil 24 winding on the lens holder 22. Specifically, the lens holder 22 is used for holding components such as lens barrel, focus lens or zoom lens, etc. in its center, which has four sides 242 parallel to the four side plates 16 of the housing 10 and four connecting sides 244 abutted to the adjacent sides 242. And space defined by each connecting side 244 and each corner of the housing is used for receiving the corresponding magnet 32 and the corresponding spacer 34. Referring to FIG. 3, a gap 26 is formed between the coil 24 and the lens holder 22, a flange 222 is extended from the lower edge of the lens holder 22 and far from the center of the lens holder 22, and the coil 24 is held by the flanges 222. Furthermore, the flanges 222 are beneficial to connect the lens holder 22 and the second spring plate 50, which will be described in detail.

Referring to FIG. 2, both the first spring plate 40 and the second spring plate 50 are foursquare. The first spring plate 40 includes a first outer frame 42, a first inner frame 44, and a first spring portion 46 connected with the first outer frame 42 and the second inner frame 44. Specifically, the first inner frame 44 is connected with the upper surface of the lens holder 22, and the first outer frame 42 is provided with four second fixing portions 422 at its four corners to connect with the first fixing portions 142 and the magnets 32 respectively. The second spring plate 50 includes a second outer frame 52, a second inner frame 54 and a second spring portion 56 connected with the second outer frame 52 and the second inner frame 54. Specifically, the second inner frame 54 is connected with the lower surface of the lens holder 22, and the second outer frame 52 is provided with four third fixing portions 522 at its four corners to connect with the lower surfaces of the spacers respectively. Further, the upper surface of the spacer is connected with the magnet 32. Preferably, the mentioned components are connected by glue. When the coil 24 on the movable assembly 20 is energized, magnetic force is generated between the coil 24 and the magnets 32 of the fixing assembly 30, so that the movable assembly 20 overcomes the spring force of the first and the second spring portions 46, 56 and moves in the cavity 12 to change the distance between the components (e.g. lens barrel, focus lens or zoom lens) and a camera sensor, thereby focusing or zooming. When the coil 24 is not energized, the movable assembly 20 will be reverted by the action of the spring force of the spring portions 46, 56.

The voice coil motor 1 has the spacer 34 whereby the second spring plate 50 is fixed to the magnet 32, while the magnet 32 is connected to the first spring plate 40 and fixed to the first portion 142 of the housing 10, thus no base 20' with cover edge 22' is used, therefore the thickness of the voice coil motor 1 is reduced to improve the performance and the practicability of the voice coil motor 1.

Preferably, as shown in FIGS. 2-7, the top plate 14 has a slot 144 to expose the first spring portion 46. In this embodiment, the amount of the slot 144 is four which is corresponding to the four spring portions 46. When the coil 24 is energized, the movable assembly 20 is moved along the center axis of the cavity 12, accordingly the first spring portions 46 are distorted to protrude toward the top plate 14 and then be received the slots 144, thus it's unnecessary to increase the height of the top plate 14 to clear the protrusion. By this token, the slots 144 on the top plate 14 are beneficial to reduce the thickness of the voice coil motor 1 further.

As shown in FIGS. 2~7, a through hole 146 is formed through the center of the top plate 14 and communicated with the cavity 12. At least two stoppers 148 are extended downward and formed around the through hole 146, which are inserted into the gap 26 between the lens holder 22 and the coil 24 to prevent the movable assembly 20 removing from the cavity 12. Preferably, the amount of the stopper 148 is four. Accordingly, the first spring plate 40 has four holes 48 to allow the stoppers 148 to pass.

Figure 8:
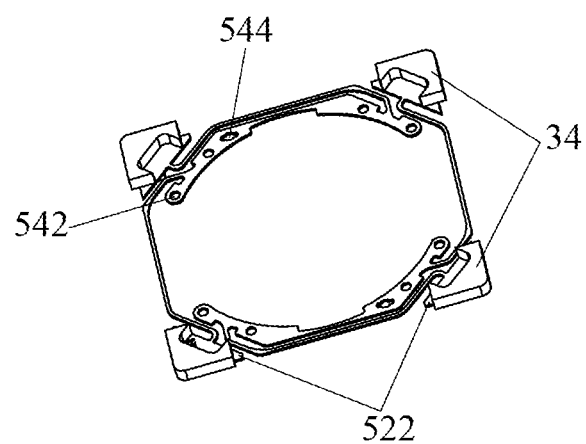
FIG. 8 is a perspective view of a spacer member and a second spring plate of the voice coil motor of FIG. 2.
Figure 9:
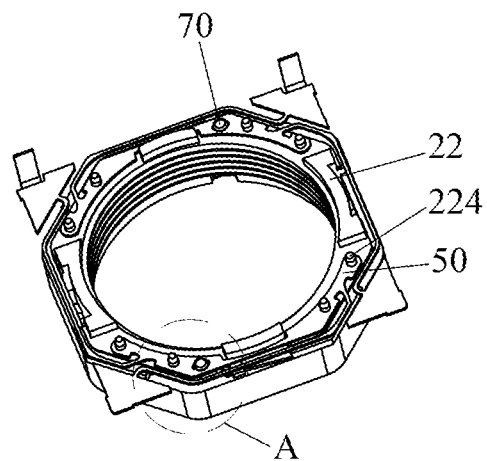
FIG. 9 is a perspective view of a second spring plate and a movable assembly of voice coil motor of FIG. 2.
Figure 10:
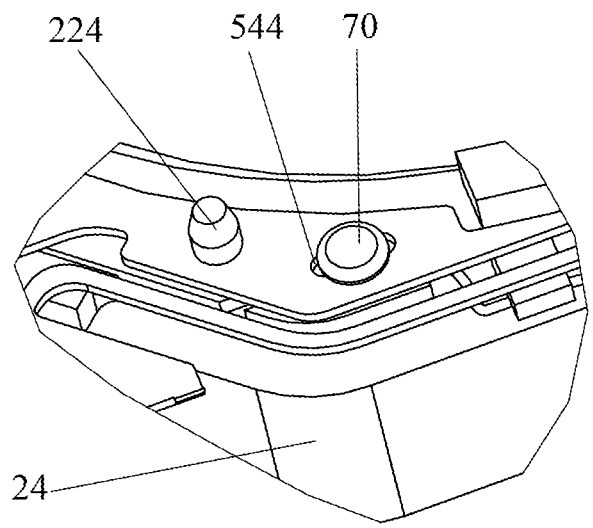
FIG. 10 is a partial perspective view of A portion of FIG. 9.
Figure 11:
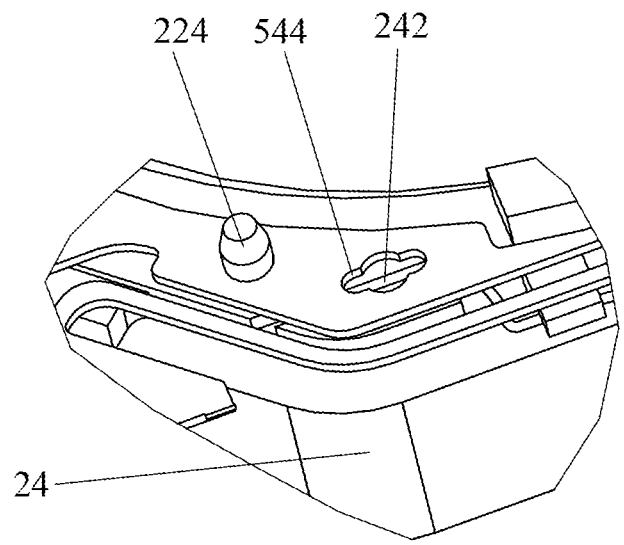
FIG. 11 is a partial perspective view of FIG. 10 in which solders are omitted.
Figure 12:
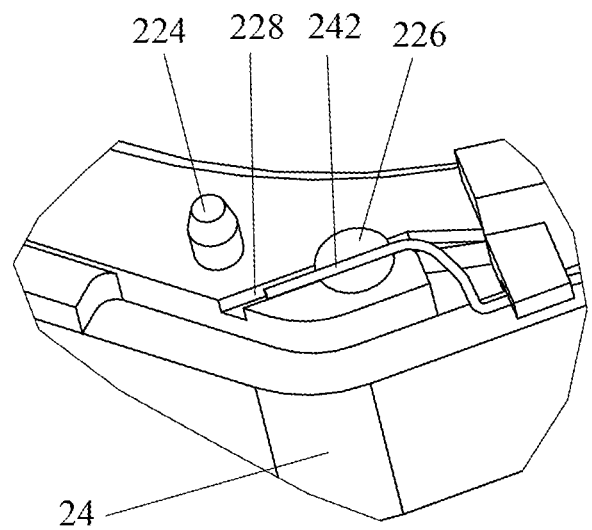
FIG. 12 is a partial perspective view of FIG. 11 in which the second spring plate is omitted.
Figure 13:
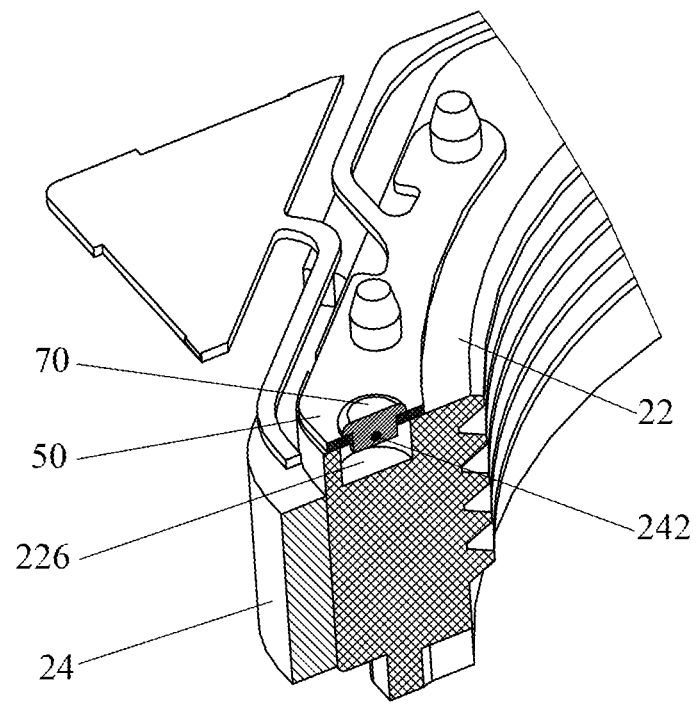
FIG. 13 is a partial sectional view of the second spring plate and the movable assembly of FIG. 9.

As shown in FIGS. 8~9, the third portions 522 of the second outer frame 52 are triangular substantially and connected with the spacers respectively, and the second inner frame 54 is connected with the lower surface of the lens holder 22. As illustrated, several locating pins 224 (e.g. eight locating pins) are formed on the lower surface of the lens holder 22 and adjacent to the connecting surfaces 244. Accordingly, several locating holes 542 are formed on the second inner frame 54 to engage with the locating pins 224. During the assembly of the voice coil motor 1, the lens holder 22 is assembled with the second spring plate 50 by inserting the locating pins 224 into the locating holes 542. Furthermore, as shown in FIGS. 9-13, the lens holder 22 and the second inner frame 54 assembled together are then connected by automatic welding, at two symmetrical welding positions (as shown in FIG. 10), for example. Specifically, a hole 544 is formed on the second inner frame 54, and a first recess 226 corresponding to the hole 544 and a second recess 228 communicated with the first recess 226 are formed in the lower surface of the lens holder 22. The coil end 242 is guided by the second recess 228 to pass through the first recess 226. When connecting the lens holder 22 with the second inner frame 54, a solder 70 is placed on the hole 544 and then is melted by laser. A portion of the cooled solder 70 is wrapped around the coil end 242 in the first recess 226, the rest of the solder 70 is maintained out of the hole 544, in such a way, the second inner frame 54 is connected with the lens holder 22. The automatic welding between the lens holder 22 and the second spring plate 50 improves the operating efficiency and reduces the manufacturing cost.

Optionally, the voice coil motor 1 further includes a base 60 located below the second spring plate 50 and connected with the second outer frame 52. Since the base 60 will not directly fixed to the housing 10, thus no cover edge 22' (as shown in FIG. 1) is required for the base 60. Instead, the base 60 is a thin plate and embedded into the housing 10, which may not increase the height of the voice coil motor 1. Additionally, the base 60 and the spacer member 34 are made of nonconductive material, such as ceramics, plastic, stainless steel or anodized aluminum preferably, to improve the rigidity of the voice coil motor 1. Of course, the base 60 is optional which will be replaced by an optical image stabilizer (not shown) arranged blow the second spring plate 50 and connected with the second outer frame 52.

Figure 14:
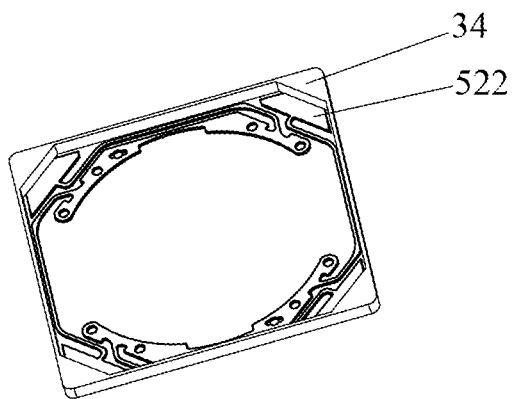
FIG. 14 is an exploded view of a voice coil motor according to a second embodiment of the present invention.
Figure 15:
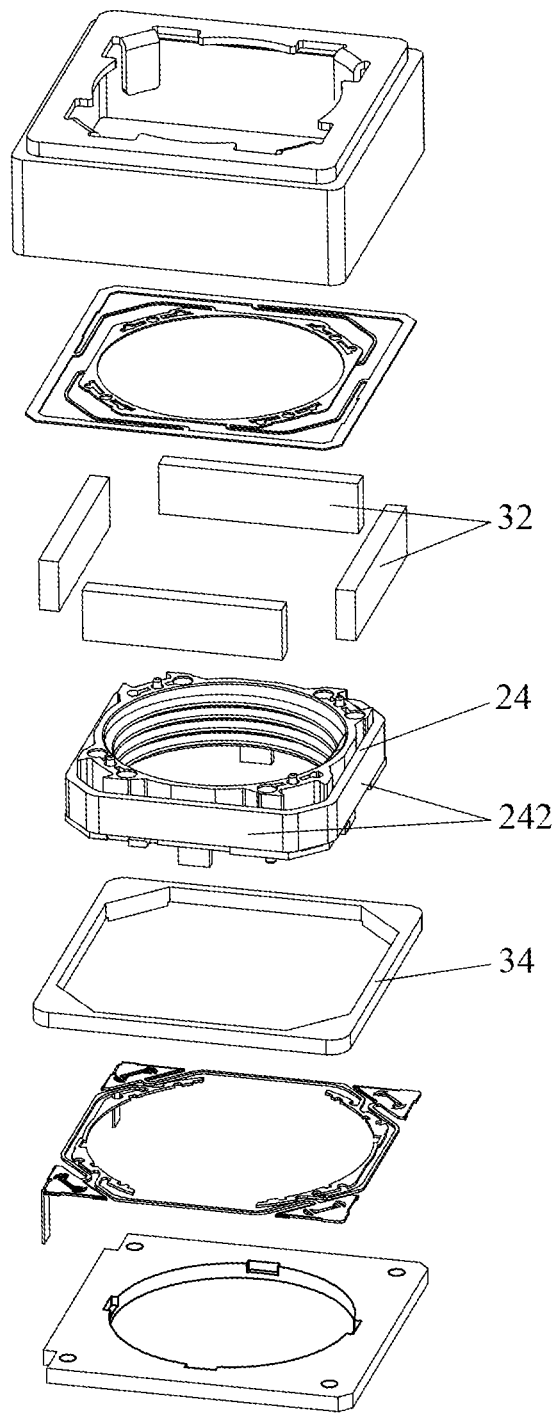
FIG. 15 is a perspective view of a spacer member and a second spring plate of the voice coil motor of FIG. 14.

FIGS. 14~15 show a second embodiment of the present invention. Structures differed from the first embodiment are explained. As illustrated, the magnets 32 are cuboid and configured at four side surfaces 242 of the coil 24. Further, the spacer member 34 is in a frame structure, which facilitates the installation.

Figure 16:
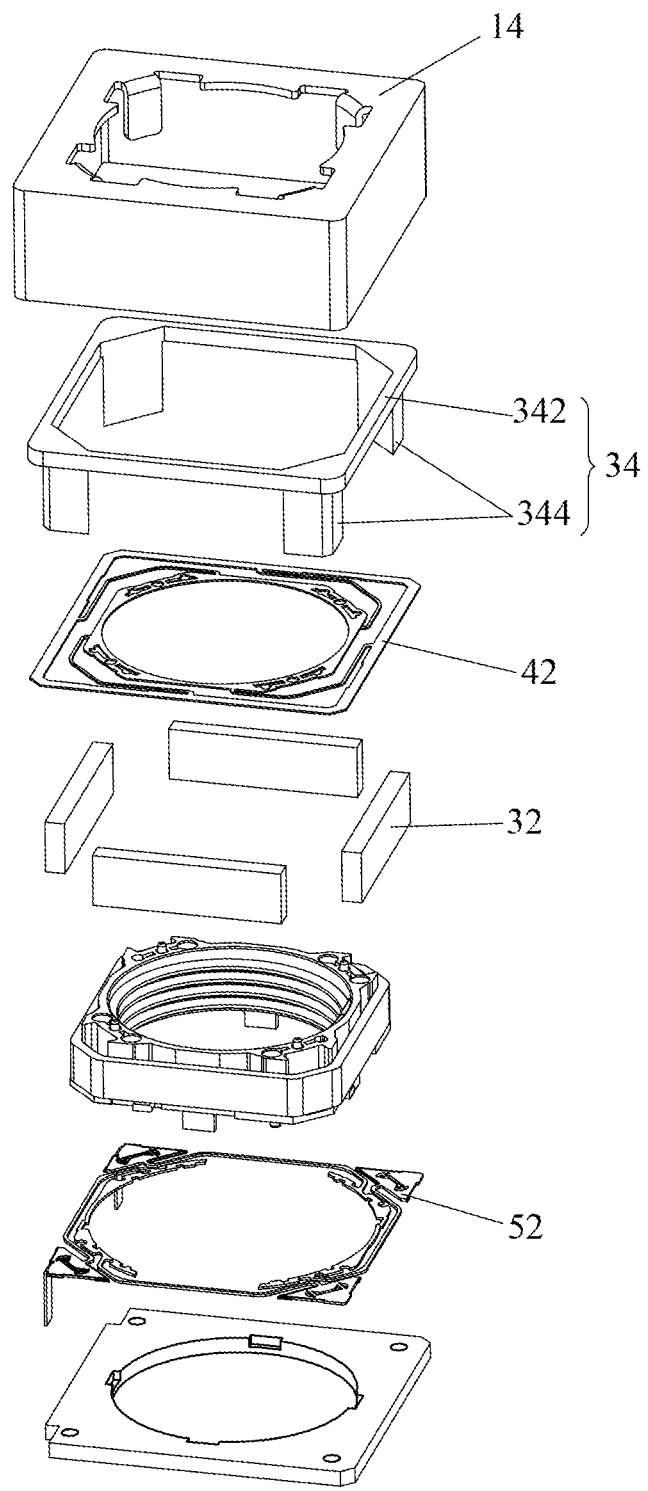
FIG. 16 is an exploded view of a voice coil motor according to a third embodiment of the present invention.

FIG. 16 shows a third embodiment of the present invention. Compared with the second one, the spacer member 34 in the present embodiment includes a frame 342 and at least two connecting arms 344 extended downward from the frame 342 and connected with the second outer frame 52. Preferably, four connecting arms 344 are located at four corners of the frame 342, and the magnet 32 is located between two connecting arms 344. The upper and lower surfaces of the frame 342 are connected with the top plate 14 and the first outer frame respectively, and the first outer frame 42 is connected with the magnets 32. Such a structure of the spacer member 34 may make the voice coil motor 1 more thinner with no base 60.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A voice coil motor, comprising:
   a housing having a cavity;
   a movable assembly received in the cavity;
   a fixing assembly configured outside of the movable assembly; and
   a first spring plate and a second spring plate configured at an upper surface and a lower surface of the movable assembly respectively;
   wherein the fixing assembly comprises at least two magnetic elements connected with the first spring plate and a spacer member configured on the second spring plate to connect the second spring plate to the magnetic elements or the housing,
   wherein the movable assembly comprises a lens holder and a coil winding on the lens holder,
   wherein the first spring plate comprises a first outer frame, a first inner frame, and a first spring portion connected with the first outer frame and the first inner frame, the second spring plate comprises a second outer frame, a second inner frame and a second spring portion connected with the second outer frame and the second inner frame, the first inner frame being connected with an upper surface of the lens holder, and the second inner frame being connected with a lower surface of the lens holder,
   wherein the housing has a top plate which has a slot to expose the first spring portion of the first spring plate and is adapted to receive the first spring portion that is protruded toward the top plate during operation.

2. The voice coil motor according to claim 1, wherein the first outer frame has an upper surface connected with the top plate and a lower surface connected with the magnetic elements, and the spacer member connects the second outer frame to the magnetic elements.

3. The voice coil motor according to claim 2, wherein the spacer member comprises at least two spacers.

4. The voice coil motor according to claim 2, wherein the spacer member is in a frame structure.

5. The voice coil motor according to claim 1, wherein the spacer member comprises a frame and at least two connecting arms extended downwards from the frame and connected with the second outer frame, and the frame has an upper surface connected to the top plate and a lower surface connected to the first outer frame.

6. The voice coil motor according to claim 1, wherein the top plate has a through hole formed on a center thereof, two stoppers are formed around the through hole and vertically extended downwards, and the stoppers are inserted between the lens holder and the coil to retain the movable assembly within the cavity.

7. The voice coil motor according to claim 1, wherein the spacer member is made of nonconductive material.

8. The voice coil motor according to claim 1, further comprising a base configured below the second spring plate and connected with the second outer frame.

9. The voice coil motor according to claim 8, wherein the base is made of nonconductive material.

10. The voice coil motor according to claim 1, wherein the second inner frame is provided with a hole, the lens holder is provided with a first recess at a lower surface thereof to align with the hole, a coil end of the coil passes through the first recess and is connected with the second inner frame via a solder, thereby connecting the second inner frame with the lens holder.

11. The voice coil motor according to claim 10, wherein the lens holder is provided with a second recess that is communicated with the first recess and configured to guide the coil end of the coil to the first recess.

12. The voice coil motor according to claim 1, wherein the at least two magnetic elements are fixed to the spacer member.

* * * * *